(12) United States Patent
Wang et al.

(10) Patent No.: US 12,728,596 B2
(45) Date of Patent: Sep. 8, 2026

(54) FILAMENT CONVEYING DEVICE AND 3D PRINTER

(71) Applicant: SHENZHEN ANYCUBIC TECHNOLOGY CO., LTD., Shenzhen (CN)

(72) Inventors: Jingjie Wang, Shenzhen (CN); Liang Tang, Shenzhen (CN)

(73) Assignee: SHENZHEN ANYCUBIC TECHNOLOGY CO., LTD., Shenzhen (CN)

( * ) Notice: Subject to any disclaimer, the term of this patent is extended or adjusted under 35 U.S.C. 154(b) by 226 days.

(21) Appl. No.: 18/608,960

(22) Filed: Mar. 19, 2024

(65) Prior Publication Data

US 2025/0144881 A1 May 8, 2025

(30) Foreign Application Priority Data

Nov. 3, 2023 (CN) ......................... 202322980728.2

(51) Int. Cl.
*B29C 64/209* (2017.01)
*B29C 64/321* (2017.01)
*B33Y 30/00* (2015.01)

(52) U.S. Cl.
CPC .......... *B29C 64/321* (2017.08); *B29C 64/209* (2017.08); *B33Y 30/00* (2014.12)

(58) Field of Classification Search
CPC ...... B29C 64/321; B29C 64/209; B33Y 30/00
See application file for complete search history.

(56) References Cited

U.S. PATENT DOCUMENTS

2023/0271382 A1* 8/2023 Taylor .................... B33Y 10/00 425/113

OTHER PUBLICATIONS

Aqua Fittings, Push to connect, https://aquafittings.com/push-to-connect-fittings/ (Year: 2016).*

* cited by examiner

*Primary Examiner* — JaMel M Nelson
*Assistant Examiner* — Erica Hartsell Funk
(74) *Attorney, Agent, or Firm* — Bayramoglu Law Offices LLC

(57) ABSTRACT

A filament conveying device includes a feeding device and a discharging channel. A plurality of filaments are supplied to the discharging channel respectively through different feeding channels, thereby reducing a number of times of manual filament changes and greatly improving printing efficiency. Filaments of different colors can be switched for conveying, and a printed model can be of multiple colors. There is no need to frequently manually change filaments during printing color change, thereby solving the problem of single color of printing and expanding a range of applications of a product.

19 Claims, 10 Drawing Sheets

FILAMENT CONVEYING DEVICE AND 3D PRINTER

CROSS REFERENCE TO THE RELATED APPLICATIONS

This application is based upon and claims priority to Chinese Patent Application No. 202322980728.2 filed on Nov. 3, 2023, the entire contents of which are incorporated herein by reference.

TECHNICAL FIELD

The present invention relates to the technical field of 3D printers, and in particular, to a filament conveying device and a 3D printer.

BACKGROUND

A 3D printer is a machine of rapid prototyping technology, and uses adhesive printing filaments, such as special wax and powdered metal or plastic, to manufacture a three-dimensional object on the basis of a digital model file by sequentially printing multiple layers of adhesive printing filaments.

The 3D printer generally uses filament consumables. Before printing, one end of a filament consumable is inserted into a print head. Since the print head of the 3D printer can convey only one filament consumable, when the filament consumable is used up during printing, it is necessary to change the consumable timely, which leads to reduction of printing efficiency. Moreover, the consumable has a fixed color, and the 3D printer usually can only implement single-color printing of a model, which leads to the single color of the printed model and poor model fineness. The present invention provides a new solution to the above problems.

SUMMARY

The present invention provides a filament conveying device and a 3D printer to overcome at least one of the above shortcomings. An objective of the present invention can be achieved by the following technical solution.

According to an embodiment of a first aspect of the present invention, a filament conveying device is provided, including a feeding device and a discharging channel, the feeding device includes at least two feeding channels, a feeding port is provided at a first end of one of the feeding channels, a discharging port is provided at a second end of the feeding channel, the feeding port is configured for feeding a printing filament, and the at least two discharging ports converge toward the discharging channel and are in communication with the discharging channel, so as to direct printing filaments in the feeding channels to the discharging channel.

In an implementation, the feeding device includes:

a first feeding mechanism including a first half housing; and a second feeding mechanism including a second half housing, the feeding channel includes a cavity defined by the first half housing and the second half housing.

In an implementation, the second feeding mechanism includes a second feeding body and a housing, the second feeding body including the second half housing, and the housing being configured to accommodate the first feeding mechanism and the second feeding body, the first feeding mechanism is movably connected to the second feeding body, and the second feeding body is movably connected to the housing; or the second feeding body is fixedly connected to the housing.

In an implementation, the feeding channel includes:

a linear section with one end starting from the feeding port; and an arc-shaped section with a first end connected to the linear section and a second end ending at the discharging port.

In an implementation, the linear section is enclosed by a portion of the first half housing, and the arc-shaped section is enclosed by a portion of the first half housing and the second half housing.

In an implementation, the linear section is closed circumferentially, and the arc-shaped section enclosed by the first half housing and the second half housing is closed circumferentially.

In an implementation, the portion of the first half housing used to enclose the linear section is arranged inside the first feeding mechanism, the portion of the first half housing used to fit with the second half housing to enclose the arc-shaped section is exposed, and the second half housing is arranged on an inner wall of the second feeding mechanism.

In an implementation, the linear section is enclosed by a portion of the first half housing and a portion of the second half housing, and the arc-shaped section is enclosed by a portion of the first half housing and a portion of the second half housing.

In an implementation, the linear section enclosed by the first half housing and the second half housing is closed circumferentially, and the arc-shaped section enclosed by the first half housing and the second half housing is closed circumferentially.

In an implementation, the first half housing is arranged on an outer wall of the first feeding mechanism, and the second half housing is arranged on the inner wall of the second feeding mechanism.

In an implementation, the filament conveying device further includes:

a plurality of guide pipes, one guide pipe including a filament channel, and the filament channels being arranged in a one-to-one correspondence with the feeding channels; and a guide connection assembly with a first end connected to the guide pipes and a second end connected to at least one of the first feeding mechanism and the second feeding mechanism.

In an implementation, the filament conveying device further includes pipe receptacles, the pipe receptacles being provided in the first feeding mechanism, arranged corresponding to the guide pipes, and it configured for connection with an end of one guide pipe.

In an implementation, the guide connection assembly includes:

connectors each with one end movably connected to the guide pipe; and a connecting seat with a first end movably connected to the connectors and a second end connected to at least one of the first feeding mechanism and the second feeding mechanism, first through holes being provided in the connecting seat for at least one of the guide pipes and the connectors to pass through.

In an implementation, the connectors are connected to the connecting seat by means of at least one of clamping connection, snap-fit connection, threaded connection, and pluggable connection; and the connectors are connected to the guide pipes by means of at least one of clamping connection, snap-fit connection, threaded connection, and pluggable connection.

In an implementation, snap fits are arranged on the connecting seat, and slots corresponding to the snap fits are provided in the second feeding mechanism.

In an implementation, operating positions of the connector includes a first position and a second position;

a portion of the connector moves close to the guide pipe when the connector moves from the second position to the first position, and the guide pipe is clamped when the connector reaches the first position; and a portion of the connector moves away from the guide pipe when the connector moves from the first position to the second position, and the guide pipe is released when the connector reaches the second position.

In an implementation, the connector includes:

an annular element, a second through hole for accommodating the guide pipe being provided in the annular element;

a clamping portion comprising at least two clamping teeth circumferentially arranged on the annular element, a first end of one tooth of the clamping teeth being fixed relative to the annular element, and a second end of the clamping tooth being a free end; and a limiting element arranged at one end of the clamping tooth away from the annular element and protruding outwardly, a cavity defined by the plurality of clamping teeth is used as a clamping cavity, and the clamping teeth are elastic such that the free ends of the clamping teeth move close to or away from the guide pipe to adjust an inner diameter of one end of the clamping cavity so as to clamp or release the guide pipe.

In an implementation, the connector further includes a tab arranged on an inner wall of one tooth of the clamping teeth and extending toward the clamping cavity, one end of the tab being connected to the clamping tooth, the other end of the tab extending toward the limiting element, and the tab having a certain elasticity.

In an implementation, an outer diameter of the end of the clamping portion connected to the annular element is less than an outer diameter of the end of the clamping portion connected to the limiting element, the outer diameter of the end of the clamping portion connected to the annular element is less than an outer diameter of the annular element, and the outer diameter of the end of the clamping portion connected to the limiting element is less than an outer diameter of the limiting element; and an inner diameter of the first through hole is greater than the outer diameter of the end of the clamping portion connected to the annular element and is less than the outer diameter of the annular element.

In an implementation, the guide connection assembly further includes elastic elements with a first end of an elastic element connected to the connector and a second end fixed relative to the connecting seat, the elastic elements being configured to apply, to the connectors, an elastic force that maintains the connectors in the first position.

In an implementation, one elastic element is at least one of a tension spring, a compression spring, a torsion spring, and an elastic piece.

In an implementation, the guide connection assembly further includes recesses provided in the first feeding mechanism and arranged corresponding to the elastic elements, at least a part of the elastic elements is located inside one of the recesses.

In an implementation, during switching of the connector between the first position and the second position, the connecting seat abuts against the outer walls of the clamping teeth, such that the clamping teeth are deformed to clamp or release the guide pipe an inner diameter of an end of the first through hole close to the annular element is greater than an inner diameter of an end of the first through hole close to the limiting element, such that the first through hole is arranged corresponding to an outer wall of the clamping portion.

In an implementation, the connecting seat abuts against the limiting element when the connector is in the first position; and the connecting seat abuts against the annular element when the connector is in the second position.

According to an embodiment of a second aspect of the present invention, a 3D printer is provided, including a filament conveying device of any one of the implementations of the first aspect described above.

The present invention provides the following beneficial technical effects. According to the contents of the disclosure, in the filament conveying device and the 3D printer according to the present invention, the filament conveying device includes the feeding device and the discharging channel, the feeding device includes the at least two feeding channels, the discharging ports of the feeding channels converge toward the discharging channel and are in communication with the discharging channel, so as to direct printing filaments in the feeding channels to the discharging channel. This can achieve switching and conveying of a plurality of filaments, so that the plurality of filaments are supplied to the discharging channel respectively through the different feeding channels, thereby reducing a number of times of manual filament changes and greatly improving printing efficiency. filaments of different colors can be switched for conveying, so that a printed model can be of multiple colors, and there is no need to frequently manually change consumables during printing color change, thereby solving the problem of relatively single color of printing consumables, expanding a range of applications of a product, improving fineness and aesthetics of the printed model, reducing the number of times of filament changes, and greatly improving printing efficiency.

The above description is merely a summary of the technical solutions of the present application. To make the technical means of the present application more clearly understood and implemented according to the contents of the specification, and to make the above and other objectives, features, and advantages of the present application more obvious and comprehensible, the embodiments of the present application are described in detail below.

BRIEF DESCRIPTION OF THE DRAWINGS

The accompanying drawings described herein are intended to provide a further understanding of the present application, and form a part of the present application. The illustrative embodiments of the present application and the description thereof are for explaining the present application and do not unduly limit the present application. In the figures.

In the figures.

100. Filament conveying device; 200. 3D printer;

1. First feeding mechanism; 2. Second feeding mechanism; 3. Guide connection assembly; 4. Guide pipe; 5. Housing; 7. Discharging channel; 8. Feeding channel;

31. Connector; 32. Connecting seat; 33. Elastic element; 34. Recess; 41. Pipe receptacle;

311. Annular element; 312. Clamping portion; 313. Limiting element; 3121. Clamping tooth; 3122. Tab;

321. First through hole; 322. Snap fit; 323. Slot;

81. First half housing; 82. Second half housing; 91. Linear section; 92. Arc-shaped section.

DETAILED DESCRIPTION OF THE EMBODIMENTS

In the following detailed disclosure, the embodiments are fully described with reference to the accompanying drawings. In order to enable those skilled in the art to have a clearer and more definite understanding of the technical solution of the present invention, the implementations described below are not limited to those. The present invention is further described in detail below with reference to the embodiments and the accompanying drawings.

In the present invention, the terms "first", "second" and "third" are for descriptive purposes only and should not be construed as indicating or implying relative importance; and the term "a plurality of" refers to two or more, unless otherwise explicitly defined. The terms such as "mount", "connected", "connection" and "fix" should be interpreted broadly. For example, the "connection" may refer to a fixed connection, a detachable connection, or an integrated connection; and the "connected" may refer to a direct connection, or an indirect connection via an intermediate medium. For those of ordinary skill in the art, specific meanings of the above terms in the present invention may be understood according to specific circumstances.

In the description of the present invention, it should be understood that orientation or position relationships indicated by the terms such as "upper", "lower", "left", "right", "front" and "rear" are based on the orientation or position relationships shown in the accompanying drawings, which are only for ease of description of the present invention and for simplifying the description, rather than indicating or implying that a device or unit referred to must have a particular direction or be constructed or operated in a particular orientation. Therefore, these terms cannot be construed as limiting the present invention.

A 3D printer in related art conveys filaments only through one feeding port, which leads to inefficient filament conveying and single color. For example, when a previous filament is used up, it is necessary to suspend printing and change the filament, and it is also necessary to suspend printing and change filaments when multi-color printing is needed, which may impair printing efficiency and lead to a problem such as a printing quality problem.

Figure 1:
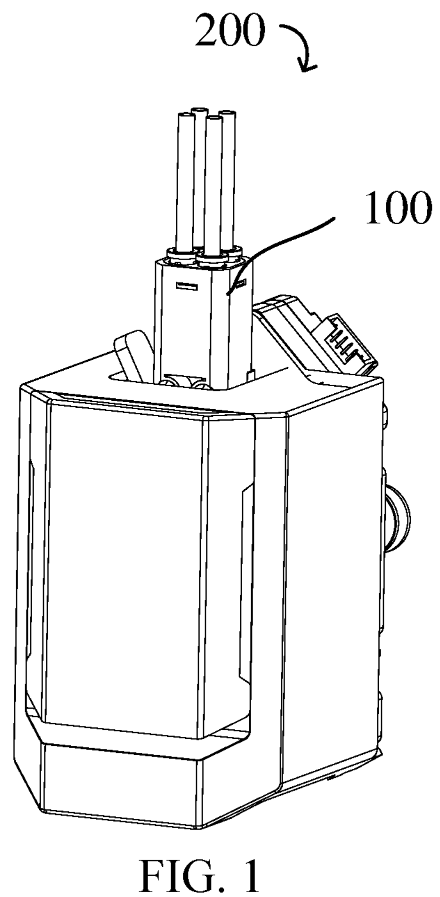
FIG. 1 shows a schematic diagram of a connection structure between a filament conveying device and a 3D printer.

As shown in FIGS. 2 to 5, the present invention provides a filament conveying device 100, which can be applied in a 3D printer 200 as shown in FIG. 1. The filament conveying device 100 of this embodiment includes a feeding device and a discharging channel 7, the feeding device includes at least two feeding channels 8, one of the feeding channels 8 is provided with a feeding port at a first end, and with a discharging port at a second end, the feeding ports are configured for feeding a printing filament, and the at least two discharging ports converge toward the discharging channel 7 and are in communication with the discharging channel 7, so as to direct printing filaments in the feeding channels 8 to the discharging channel 7.

The at least two feeding channels 8 may be two, three, four or a different number of feeding channels, and the feeding channels 8 are arranged in a filament conveying direction.

Figure 2:
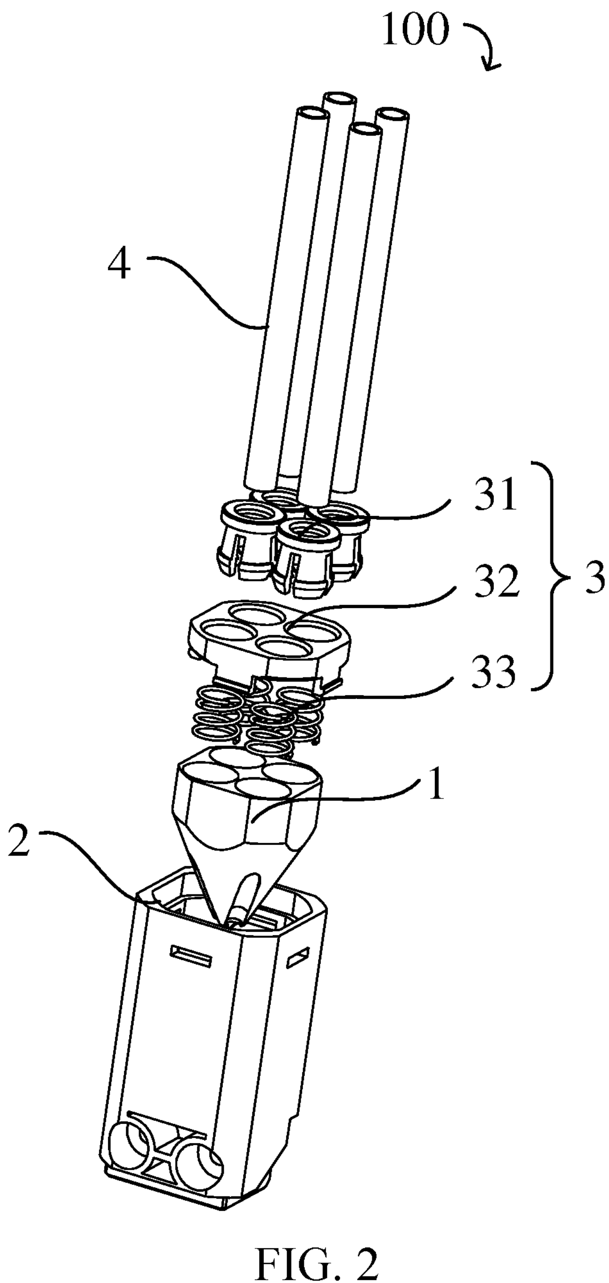
FIG. 2 shows an exploded perspective schematic diagram of a structure of the filament conveying device.

In the filament conveying device 100 according to this embodiment, a plurality of filaments respectively pass through different feeding channels 8, and the filaments are directed in the feeding channels 8 to the discharging channel 7, so that the plurality of filaments are switched relative to the discharging channel 7 for conveying. Filaments supplied to the discharging channel 7 through the feeding channel 8 may have the same color or different colors. As shown in FIG. 2, four feeding channels 8 are provided, and printing filaments with at most four different colors can be supplied to the discharging channel 7. Specifically, the color arrangement of filaments may be selected according to requirements of model printing to meet different requirements of the printed model.

Further, when a plurality of consumables are of the same color, and when a filament is used up or is about to be used up, the filament can be quickly changed, thereby achieving quick switching between a plurality of filaments, reducing the number of times of manual filament changes, and improving printing efficiency.

Further, when a plurality of consumables are of different colors, and when it is necessary to change for a filament of a different color, the filament of a different color can be changed for, thereby achieving quick switching between filaments of different colors, solving the problem of single color of printing consumables, expanding a range of applications of a product, improving the fineness and aesthetics of a printed model, reducing the number times of manual filament changes, and improving printing efficiency.

It may be understood that the filament conveying device 100 according to the embodiment of the present invention can provide a single-color printing filament to achieve single-color printing of a printed model, and can also provide multi-color printing consumables to achieve multi-color printing of a printed model, thereby providing a wide range of applications.

In an implementation of the present invention, the feeding device includes a first feeding mechanism 1 and a second feeding mechanism 2, the first feeding mechanism 1 includes a first half housing 81, the second feeding mechanism 2 includes a second half housing 82, and the feeding channel 8 includes a cavity defined by the first half housing 81 and the second half housing 82.

Figure 4:
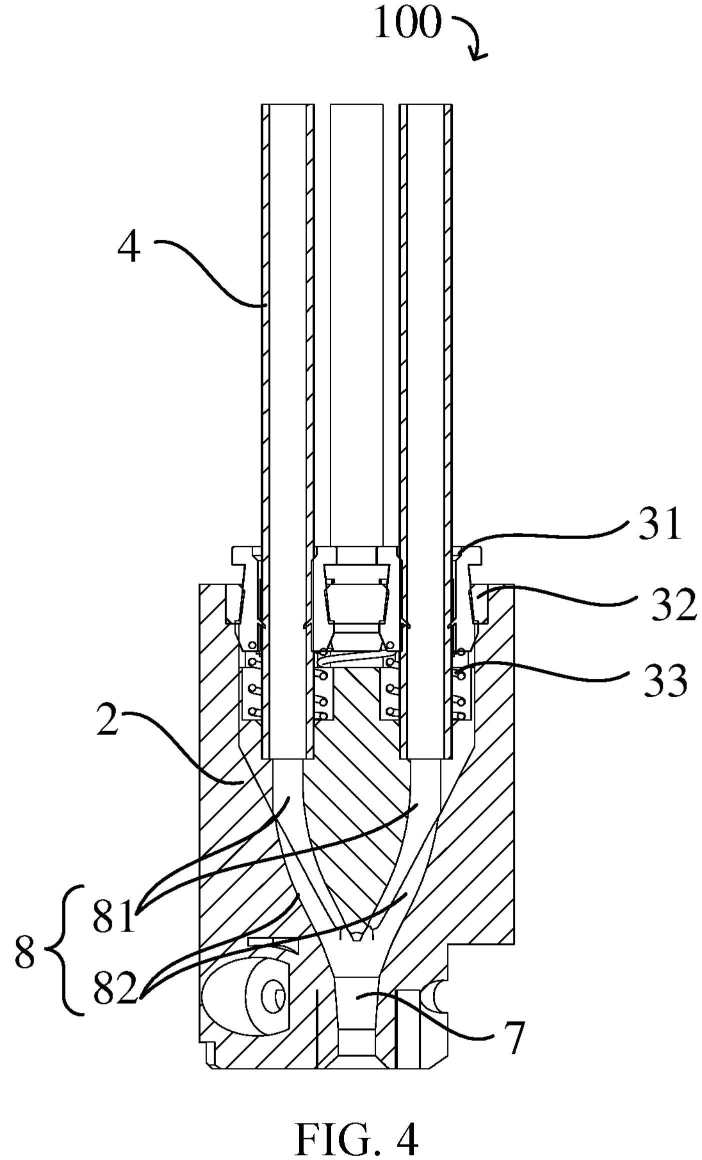
FIG. 4 shows a front sectional view of the filament conveying device.
Figure 5:
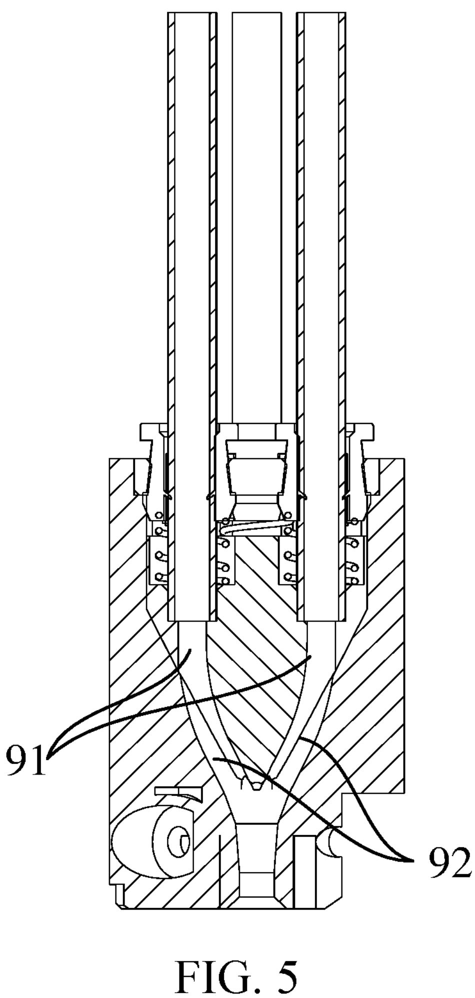
FIG. 5 shows a front sectional view of a linear section and an arc-shaped section.

As shown in FIGS. 2, 4 and 5, filaments are directed through the feeding channels 8 and are supplied to the discharging channel 7, the feeding channels 8 has a feeding port and a discharging port, and the filaments enter the feeding channels 8 through the feeding ports to complete directing and then enter the discharging channel 7 through the discharging ports.

It may be understood that, as shown in FIG. 2, the first feeding mechanism 1 is used in combination with the second feeding mechanism 2, and the first feeding mechanism 1 is arranged inside the second feeding mechanism 2. As shown in FIGS. 6-9, an outer wall of a portion of the first feeding mechanism 1 connected to the second feeding mechanism 2 and close to the discharging channel 7 is arranged obliquely inwardly to form a conical structure, at least two feeding channels 8 are enclosed by the first half housing 81 of the first feeding mechanism 1 and the second half housing 82 of the second feeding mechanism 2, and a portion of the feeding channel 8 close to the discharging channel 7 is inclined toward the discharging channel 7.

As shown in FIG. 2, the cavities defined between the first half housing 81 and the second half housing 82 are feeding channels 8, ends of feeding channels 8 close to the feeding ports are distributed, and axial directions of the feeding ports of the plurality of feeding channels 8 are parallel to each other or are diffused obliquely outwardly to avoid collisions between filaments located outside the feeding channels 8.

Figure 3:
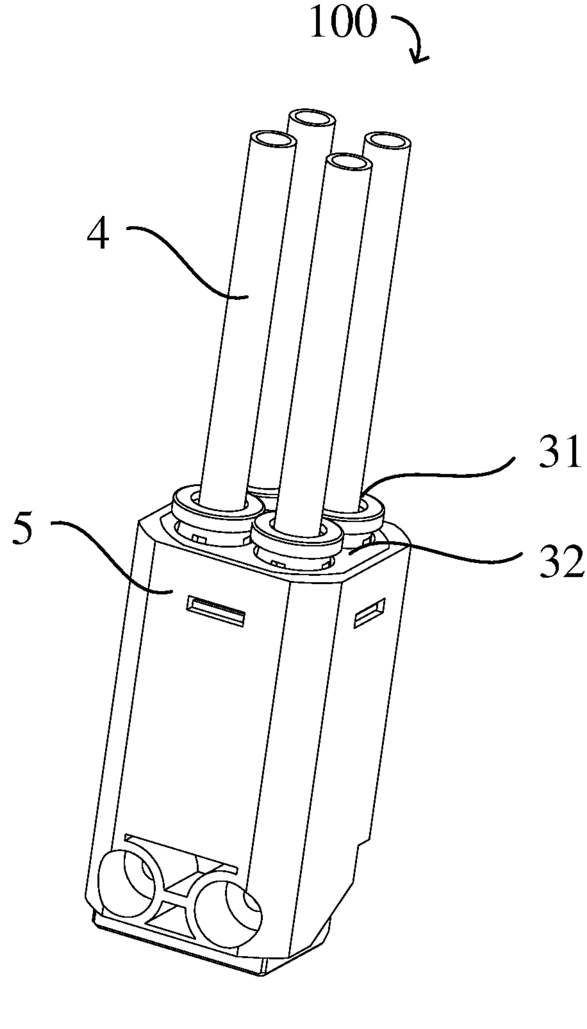
FIG. 3 shows a schematic diagram of an overall structure of the filament conveying device.
Figure 11:
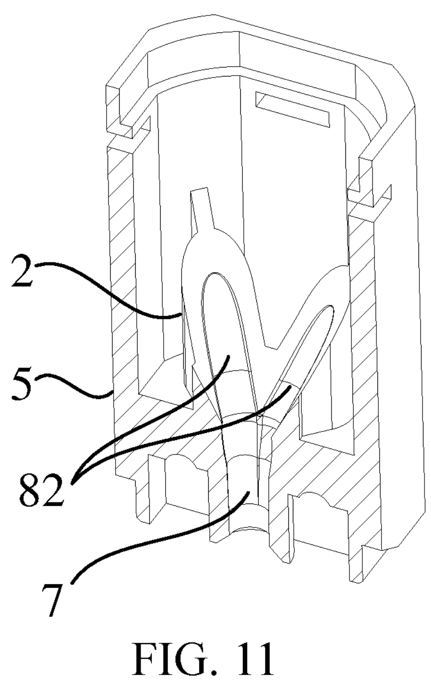
FIG. 11 shows a structural sectional view of a second feeding mechanism.
Figure 13:
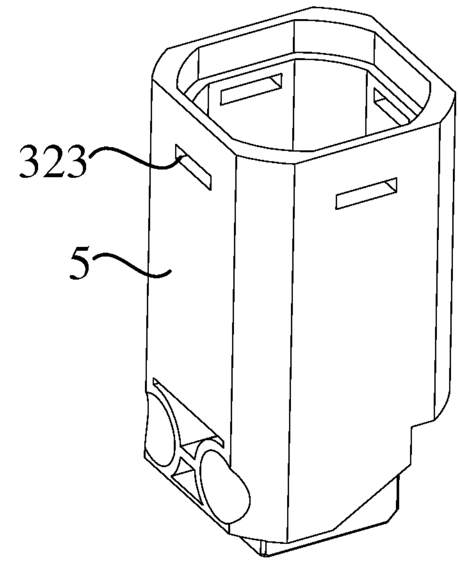
FIG. 13 shows a schematic structural diagram of a housing.

In an implementation of the present invention, as shown in FIGS. 3, 11 and 13, the second feeding mechanism 2 includes a second feeding body and a housing 5, the second feeding body includes the second half housing 82, and the housing 5 is configured to accommodate the first feeding mechanism 1 and the second feeding body.

The second feeding body is arranged inside the housing 5, and is fixed relative to the housing 5. The second feeding body and the housing 5 may be fixedly connected or movably connected to each other, and the second feeding body and the housing 5 may be of an integrally formed structure or separate structures that are connected. It may be understood that the second half housing 82 is arranged on the second feeding body.

With the second feeding body and the housing 5 being movably connected to each other, the positions of the second feeding body and the housing 5 are ensured to be fixed relative to each other during filament conveying, and a connecting structure is provided for connecting the second feeding body to the housing 5. The connecting structure may be a bolt, a mortise and tenon, or other structures, so as to ensure that the second feeding body and the housing 5 will not be displaced due to a feeding action, and maintain the structural stability of the feeding channels 8.

Further, the first feeding mechanism 1 is movably connected to the second feeding body, and the positions of the first feeding mechanism 1 and the second feeding mechanism 2 are ensured to be fixed relative to each other during the filament conveying, so as to maintain the structural stability of the feeding channel 8.

In an implementation of the present invention, as shown in FIG. 5, the feeding channel 8 includes a linear section 91 and an arc-shaped section 92, one end of the linear section 91 starts from the feeding port, and the arc-shaped section 92 is connected to the linear section 91 at one end, and the other end of the arc-shaped section ends at the discharging port.

As shown in FIG. 5, a filament enters the linear section 91 through the feeding port, and the filament abuts against the arc-shaped section 92 or a junction of the arc-shaped section 92 and the linear section 91, such that the filament is bent and is deformed along the shape of the arc-shaped section 92, and is supplied to the discharging channel 7.

Further, as shown in FIGS. 4 and 11, an end of the second half housing 82 opposite to the feeding port may has a smooth arc-shaped inner surface to guide the filament entering the feeding channel 8, so as to bend the filament in a direction close to the discharging channel 7. The arc-shaped inner surface contributes to guiding the filament entering the feeding channel 8, so as to prevent incapability of the filament to enter the discharging channel 7 due to a collision with an inner wall of the feeding channel 8, which otherwise results in a problem such as filament blockage.

It may be understood that the radian and length of the arc-shaped section 92 may be set according to the material of the filament, such as hardness, elasticity, size, and other properties, to meet requirements of different printing filaments.

In an embodiment of the present invention, as shown in FIGS. 4 and 5, the linear section 91 is enclosed by a portion of the first half housing 81, and the arc-shaped section 92 is enclosed by the second half housing 82 and a portion of the first half housing 81.

The linear section 91 is located inside the first feeding mechanism 1, and the arc-shaped section 92 is enclosed by the first feeding mechanism 1 and the second feeding mechanism 2. When the second feeding mechanism 2 includes the second feeding body and the housing 5, the arc-shaped section 92 is enclosed by the first feeding mechanism 1 and the second feeding body.

It may be understood that the linear section 91 is arranged in a direction in which the filament enters from the feeding port, a first end of the arc-shaped section 92 is connected to the linear section 91, and the other end of the arc-shaped section 92 is connected to the discharging channel 7.

In an implementation, preferably, the feeding channel 8 is closed circumferentially, that is, the linear section 91 is closed circumferentially and the arc-shaped section 92 is closed circumferentially, that is, the linear section 91 is closed circumferentially, and the arc-shaped section 92 enclosed by the first half housing 81 and the second half housing 82 is closed circumferentially.

As shown in FIGS. 4-7, in this embodiment, the linear section 91 is located in the first feeding mechanism 1, a portion of the arc-shaped section 92 is located in the first feeding mechanism 1, and the other portion of the arc-shaped section 92 is located in the second feeding mechanism 2, that is, the feeding channel 8 formed by assembling the first half housing 81 and the second half housing 82 is closed circumferentially, and an interface between the first half housing 81 and the second half housing 82 is located in the arc-shaped section 92.

Figure 6:
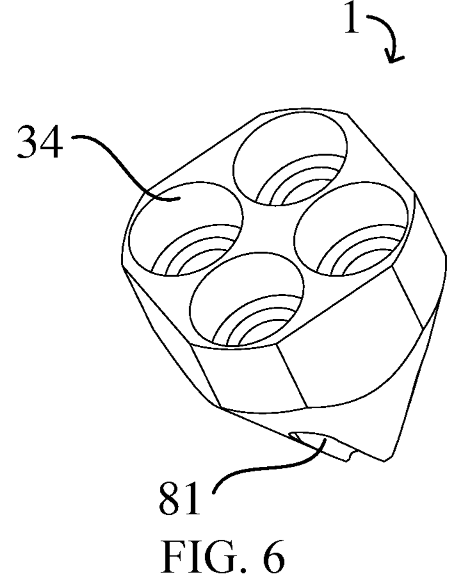
FIG. 6 shows a schematic structural diagram of a first feeding mechanism from a perspective.
Figure 7:
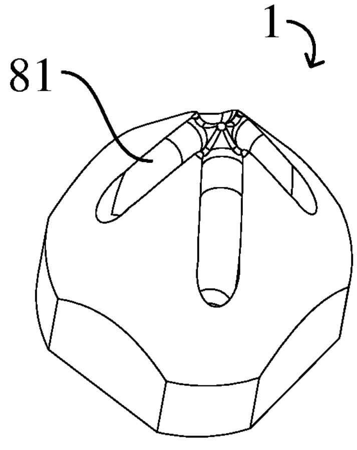
FIG. 7 shows a schematic structural diagram of the first feeding mechanism from another perspective.
Figure 10:
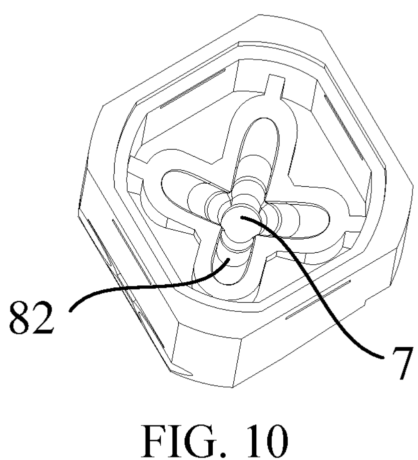
FIG. 10 shows a schematic structural diagram of a second feeding mechanism from a perspective.

Further, as shown in FIGS. 6 and 7, the portion of the first half housing 81 used to enclose the linear section 91 is arranged inside the first feeding mechanism 1, and the portion of the first half housing 81 used to fit with the second half housing 82 to enclose the arc-shaped section 92 is exposed. As shown in FIGS. 10 and 11, the second half housing 82 is arranged on an inner wall of the second feeding mechanism 2.

In another implementation of the present invention, the linear section 91 is enclosed by a portion of the first half housing 81 and a portion of the second half housing 82, and the arc-shaped section 92 is enclosed by a portion of the first half housing 81 and a portion of the second half housing 82.

In this embodiment, the linear section 91 and the arc-shaped section 92 are both enclosed by the first feeding mechanism 1 and the second feeding mechanism 2, that is, a semicircular or arc-shaped groove is provided in the first feeding mechanism 1, a semicircular or arc-shaped groove is provided in the second feeding mechanism 2, and the semicircular or arc-shaped groove of the first feeding mechanism 1 is assembled with the semicircular or arc-shaped groove of the second feeding mechanism to form at least one of the complete linear section 91 and arc-shaped section 92; and when the second feeding mechanism 2 includes the second feeding body and the housing 5, the arc-shaped section 92 is enclosed by the first feeding mechanism 1 and the second feeding body.

In an implementation, preferably, the feeding channel 8 is closed circumferentially, that is, the linear section 91 is closed circumferentially and the arc-shaped section 92 is closed circumferentially, that is, the linear section 91 enclosed by the first half housing 81 and the second half housing 82 is closed circumferentially, and the arc-shaped section 92 enclosed by the first half housing 81 and the second half housing 82 is closed circumferentially.

In this embodiment, a part of the linear section 91 is located in the first feeding mechanism 1, the rest of the linear section 91 is located in the second feeding mechanism 2, a part of the arc-shaped section 92 is located in the first feeding mechanism 1, and the rest of the arc-shaped section 92 is located in the second feeding mechanism 2, that is, the feeding channel 8 formed by assembling the first half housing 81 and the second half housing 82 is closed circumferentially, and an interface between the first half housing 81 and the second half housing 82 is located in the linear section 91 and the arc-shaped section 92, and preferably, is arranged in an axial direction of the feeding channel 8.

Further, the first half housing 81 is arranged on an outer wall of the first feeding mechanism 1, and the second half housing 82 is arranged on the inner wall of the second feeding mechanism 2.

In an embodiment of the present invention, the feeding channel 8 may be circular in cross section, which facilitates guiding the filament into the feeding channel 8, so as to prevent the inner wall of the feeding channel 8 from squeezing the filament to cause the problem of filament blockage.

The feeding channel 8 may also be shaped differently, such as polygonal, elliptical, arc-shaped, in cross section, provided that the filament can be guided and directed into the discharging channel 7.

In an implementation, the feeding channel 8 is not closed circumferentially, that is, at least a part of the linear section 91 or the arc-shaped section 92 is not closed circumferentially. Since the filament abuts against the inner wall of the feeding channel 8 in the feeding channel 8, an opening region is located on an inner side of the feeding channel 8, so as to prevent the filament from coming into contact with the opening region, and the width of the opening is less than the diameter of the filament, so as to prevent the filament from entering the opening position. Further, a function of cutting off the filament can be achieved by providing a cutter. The cutter can cut off the filament from the discharging channel 7, or may be arranged in the first feeding mechanism 1 to cut off the filament from the feeding channel 8 through the opening region.

In an implementation of the present invention, the filament conveying device 100 further includes a plurality of guide pipes 4 and a guide connection assembly 3, the guide pipe 4 includes a filament channel, and the filament channels are arranged in an one-to-one correspondence with the feeding channels 8; and the guide connection assembly 3 is connected to the guide pipes 4 at a first end, and is connected to at least one of the first feeding mechanism 1 and the second feeding mechanism 2 at a second end.

As shown in FIGS. 2 and 4, a guide pipe 4 is correspondingly arranged at the position of the feeding port of the feeding channel 8, the filament enters the feeding channel 8 through the guide pipe 4, and the guide pipe 4 is connected to at least one of the first feeding mechanism 1 and the second feeding mechanism 2 by means of the guide connection assembly 3.

When the second feeding mechanism 2 includes the second feeding body and the housing 5, the guide connection assembly 3 may be connected to the housing 5.

Figure 8:
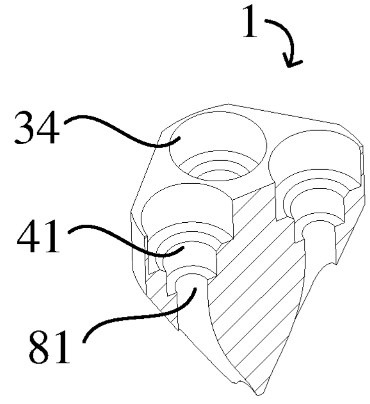
FIG. 8 shows a structural sectional view of the first feeding mechanism.
Figure 9:
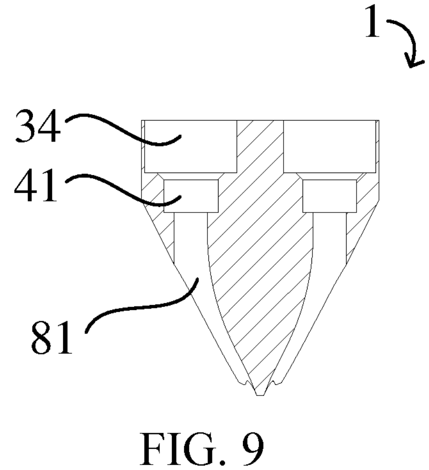
FIG. 9 shows a front sectional view of the first feeding mechanism.

Further, as shown in FIGS. 8 and 9, the filament conveying device 100 further includes pipe receptacles 41, the pipe receptacles 41 are provided in the first feeding mechanism 1, are arranged corresponding to the guide pipes 4, and are configured to be connected to an end of one guide pipe 4.

It may be understood that the inner diameter of one of the pipe receptacles 41 is greater than the outer diameter of one of the guide pipes 4, the guide pipe 4 is at least partially inserted into the pipe receptacle 41 to fix an end of the guide pipe 4, and the pipe receptacles 41 cooperate with the guide connection assembly 3 to improve the stability of the guide pipes 4.

In this embodiment, as shown in FIGS. 2-4, the guide connection assembly 3 includes connectors 31, and the connectors 31 are movably connected to the guide pipes 4 at one end. It may be understood that the guide pipes 4 are detachably connected to the connectors 31, and the guide pipes 4 are finally connected to at least one of the first feeding mechanism 1 and the second feeding mechanism 2 by means of the connectors 31.

Figure 12:
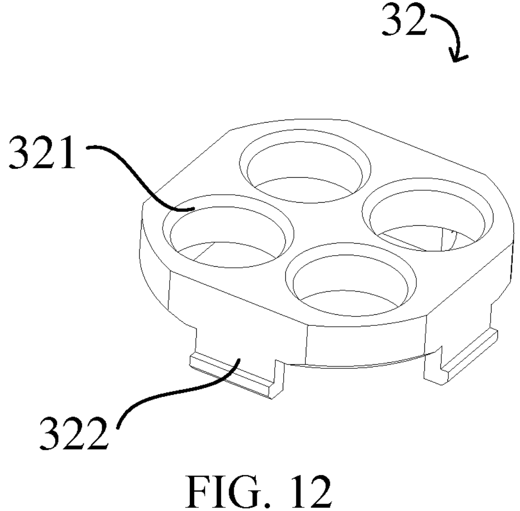
FIG. 12 shows a schematic structural diagram of a connecting seat.

As shown in FIGS. 2-4, the guide connection assembly 3 further includes a connecting seat 32, the connecting seat 32 is movably connected to the connector 31 at one end, and is connected to at least one of the first feeding mechanism 1 and the second feeding mechanism 2 at the other end. As shown in FIG. 12, first through holes 321 are provided in the connecting seat 32 for at least one of the guide pipes 4 and the connectors 31 to pass through.

In practice, the guide pipes 4 are connected to the connecting seat 32 by means of the connectors 31, and the connecting seat 32 is connected to at least one of the first feeding mechanism 1 and the second feeding mechanism 2. When the second feeding mechanism 2 includes the second feeding body and the housing 5, the connecting seat 32 may be connected to the housing 5. It may be understood that the first through holes 321 in the connecting seat 32 are arranged in a one-to-one correspondence with the guide pipes 4, one guide pipe 4 passes through one first through hole 321, and one end of the guide pipe is inserted into the pipe receptacle 41, so that the position stability of the guide pipe 4 can be improved.

As shown in FIGS. 12 and 13, snap fits 322 are arranged on the connecting seat 32, and slots 323 corresponding to the snap fits 322 are provided in the second feeding mechanism 2. The snap fits 322 protruding outwardly are arranged on the connecting seat 32, the slots 323 arranged in a one-to-one correspondence with the snap fits 322 are provided in the second feeding mechanism 2. When the connecting seat 32 is connected to the second feeding mechanism 2, the snap fits 322 are inserted into the slots 323 to allows the connecting seat 32 to be fixed relative to the second feeding mechanism 2. It may be understood that when the second feeding mechanism 2 includes the second feeding body and the housing 5, as shown in FIG. 13, the slots 323 are provided in the housing 5.

Figure 16:
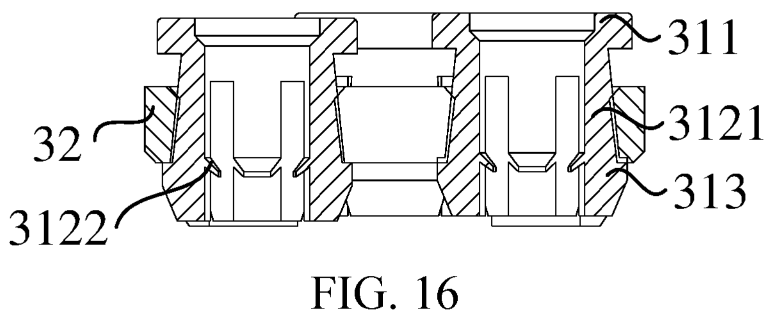
FIG. 16 shows a front sectional view of the connector and the connecting seat when the connector is in a first position.
Figure 17:
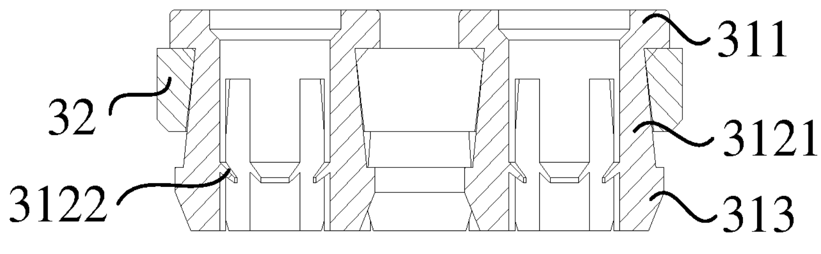
FIG. 17 shows a front sectional view of the connector and the connecting seat when the connector is in a second position.

Further, as shown in FIGS. 16 and 17, operating positions of the connectors 31 include a first position and a second position; and when the connector 31 moves from the second position to the first position, a portion of the connector 31 moves close to the guide pipe 4, and when the connector 31 reaches the first position, the guide pipe 4 is clamped; and when the connector 31 moves from the first position to the second position, a portion of the connector 31 moves away from the guide pipe 4, and when the connector 31 reaches the second position, the guide pipe 4 is released.

It may be understood that the guide pipe 4 is clamped by the connector 31, so that the guide pipe 4 is clamped or released during the switching of the connector 31 between the first position and the second position.

Figure 14:
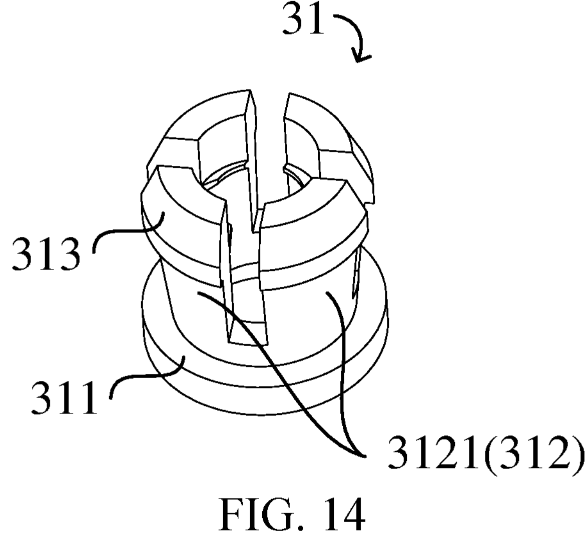
FIG. 14 shows a perspective schematic diagram of a structure of a connector.
Figure 15:
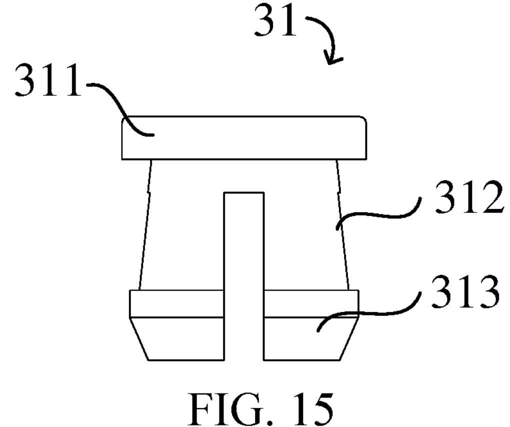
FIG. 15 shows a front structural view of the connector.

Further, as shown in FIGS. 14 and 15, the connector 31 includes an annular element 311, a clamping portion 312, and a limiting element 313. A second through hole is provided in the annular element 311 for accommodating the guide pipe 4. The clamping portion 312 includes at least two clamping teeth 3121 arranged on the annular element 311 in a circumferential direction. A first end of tooth of the clamping teeth 3121 is fixed relative to the annular element 311, and a second end of the clamping tooth 3121 is a free end. The limiting element 313 is arranged at an end of the clamping tooth 3121 away from the annular element 311 and protrudes outwardly.

The guide pipe 4 penetrates the connector 31, and the guide pipe 4 passes through the second through hole in the annular element 311. The clamping portion 312 is sleeved on the guide pipe 4, and the at least two clamping teeth 3121 are arranged around the guide pipe 4 in the circumferential direction. When the connector 31 clamps the guide pipe 4, the clamping teeth 3121 abut against an outer wall of the guide pipe 4. It may be understood that at least two clamping teeth 3121 are provided, and the at least two clamping teeth 3121 are correspondingly arranged to clamp the guide pipe 4. During clamping or releasing of the guide pipe 4 by the connector 31, the clamping teeth 3121 are deformed, and the free ends of the clamping teeth 3121 move close to or away from the guide pipe 4.

A cavity defined by the plurality of clamping teeth 3121 is used as a clamping cavity, and the clamping teeth 3121 are elastic such that the free ends of the clamping teeth 3121 move close to or away from the guide pipe 4 to adjust the inner diameter of one end of the clamping cavity so as to clamp or release the guide pipe 4. In practice, the clamping teeth 3121 may be made of a material such as plastics, rubber and metal, preferably of a metal with certain hardness and elasticity, such as iron, steel and copper, or of an alloy.

As shown in FIGS. 14 and 15, an outer diameter of the end of the clamping portion 312 connected to the annular element 311 is less than an outer diameter of the end of the clamping portion 312 connected to the limiting element 313, the outer diameter of the end of the clamping portion 312 connected to the annular element 311 is less than an outer diameter of the annular element 311, and the outer diameter of the end of the clamping portion 312 connected to the limiting element 313 is less than an outer diameter of the limiting element 313. As shown in FIGS. 4, 16 and 17, an inner diameter of the first through hole 321 is greater than the outer diameter of the end of the clamping portion 312 connected to the annular element 311, and is less than the outer diameter of the annular element 311.

It may be understood that the annular element 311 protrudes outwardly relative to the clamping portion 312 connected thereto, the limiting element 313 protrudes outwardly relative to the clamping portion 312 connected thereto, and the annular element 311 and the limiting element 313 respectively form stops against the connecting seat 32 at two ends of the clamping portion 312. The inner diameter of the connecting seat 32 is greater than the outer diameter of the end of the clamping portion 312 connected to the annular element 311. When the connector 31 is squeezed by no external force, the inner diameter of the connecting seat 32 is less than the outer diameter of the end of the clamping portion 312 connected to the limiting element 313. When the connector 31 is squeezed by the connecting seat 32, the free ends of the clamping teeth 3121 move toward the guide pipe 4 until the free ends abut against the guide pipe 4. In this case, the inner diameter of the connecting seat 32 is greater than the outer diameter of the clamping portion 312, and the inner diameter of the connecting seat 32 is less than the outer diameter of the limiting element 313.

As shown in FIGS. 16 and 17, during switching of the connector 31 between the first position and the second position, the connecting seat 32 abuts against the outer walls of the clamping teeth 3121, such that the clamping teeth 3121 are deformed to clamp or release the guide pipe 4.

In practice, an inner diameter of one end of the first through hole 321 close to the annular element 311 is greater than an inner diameter of an end of the first through hole 321 close to the limiting element 313, such that the first through hole is arranged corresponding to an outer wall of the clamping portion 312. It may be understood that the first through hole 321 is trapezoidal in cross section, which is adapted to the shape of the outer wall of the clamping portion 312 of the connector 31.

In an implementation of the present invention, as shown in FIGS. 2 and 4, the guide connection assembly 3 further includes elastic elements 33, a first end of the elastic elements 33 is connected to the connector 31, a second end of the elastic elements 33 is fixed relative to the connecting seat 32, and the elastic elements 33 are configured to apply, to the connectors 31, an elastic force that maintains the connectors 31 in the first position.

It may be understood that the elastic element 33 is arranged to drive the connector 31 to switch from the second position to the first position, and the elastic force is applied to the connector 31 to maintain the connector 31 in the first position, such that the connector 31 moves to an operating position that allows for the clamping of the guide pipe 4.

The elastic element 33 is located outside a filament feeding trajectory, that is, the elastic element may be arranged outside the guide pipe 4 or is sleeved on the guide pipe 4. The first end of the elastic element 33 is connected to the connector 31, and the other end of the elastic element 33 is connected to the first feeding mechanism 1 or the second feeding mechanism 2. The elastic element 33 applies a force to the connector 31 to cause the limiting element 313 of the connector 31 to abut against the connecting seat 32, and the clamping teeth 3121 are squeezed by the first through hole 321 to be deformed inwardly and abut against the out wall of the guide pipe 4 so as to clamp the guide pipe 4. Therefore, under the action of the elastic element, the connector 31 is maintained in the first position to clamp the guide pipe 4.

When the connector 31 is in the first position or the second position, the elastic element 33 can remain in a deformed state, thereby maintaining an acting force applied to the connector 31.

In this embodiment, an example of the elastic element 33 as a compression spring is provided, in which the first end of the elastic element 33 abuts against or is fixedly connected to the connector 31, and the second end of the elastic element 33 abuts against or is fixedly connected to the first feeding mechanism 1, that is, the second end of the elastic element 33 and the connecting seat 32 are ensured to be stationary relative to each other. As shown in FIGS. 6, 8 and 9, the guide connection assembly 3 further includes recesses 34. The recesses 34 is provided in the first feeding mechanism 1 and is arranged corresponding to one elastic element 33, and at least a part of the elastic element 33 is located inside the recess 34. It may be understood that the recess 34 is provided at the feeding port of the feeding channel 8 of the first feeding mechanism 1 to accommodate the elastic element 33 and improve the stability of the elastic element 33.

The pipe receptacle 41 for connecting to a guide pipe is provided at the feeding port. If the elastic element 33 is sleeved on the guide pipe 4, an inner diameter of the recess 34 is greater than an inner diameter of the pipe receptacle 41. In view of this, preferably, the recess 34 is provided on a side of the pipe receptacle 41 close to the connecting seat 32, and preferably, the recess 34, the pipe receptacle 41 and the feeding port of the feeding channel 8 are coaxially arranged.

In an embodiment of the present invention, the elastic element 33 is at least one of a tension spring, a compression spring, a torsion spring, and an elastic piece.

In some possible embodiments of the present disclosure, the elastic element 33 is a tension spring, a first end of the tension spring is connected to the connector 31, and a second end of the tension spring is fixed relative to the connecting seat 32, that is, the second end of the tension spring is connected to the connecting seat 32. The tension spring is located outside the guide pipe 4 or sleeved on an outer peripheral side of the guide pipe 4, and can stably provide an elastic force, such that a connector can be switched from the second position to the first position until the connector is maintained in the first position.

In some possible embodiments of the present disclosure, the elastic element 33 is a compression spring, a first end of the compression spring is connected to the connector 31, and a second end of the compression spring is fixed relative to the connecting seat 32, that is, the second end of the compression spring is connected to the first feeding mechanism 1. The compression spring is located outside the guide pipe 4 or sleeved on the outer peripheral side of the guide pipe 4, and can stably provide an elastic force, such that the connector can be switched from the second position to the first position until the connector is maintained in the first position.

In some possible embodiments of the present disclosure, the elastic element 33 is a torsion spring, a first end of the torsion spring is connected to the connector 31, and a second end of the torsion spring is fixed relative to the connecting seat 32, that is, the second end of the torsion spring is connected to the first feeding mechanism 1 or the connecting seat 32. The torsion spring is located outside the guide pipe 4, and can stably provide an elastic force, such that the connector can be switched from the second position to the first position until the connector is maintained in the first position.

In some possible embodiments of the present disclosure, the elastic element 33 is an elastic piece, a first end of the elastic piece is connected to the connector 31, and a second end of the elastic piece is fixed relative to the connecting seat 32, that is, the second end of the elastic piece is connected to the first feeding mechanism 1 or the connecting seat 32. The elastic piece is located outside the guide pipe 4 or sleeved on the outer peripheral side of the guide pipe 4, and can stably provide an elastic force, such that the connector can be switched from the second position to the first position until the connector is maintained in the first position.

It may be understood that the elastic element 33 may also be an elastic component other than the tension spring, the compression spring, the torsion spring, and the elastic piece, as long as an elastic force can be provided such that the connector 31 can be switched from the second position to the first position.

As shown in FIGS. 16 and 17, when the connector 31 is in the first position, the connecting seat 32 abuts against the limiting element 313. During switching of the connector 31 from the second position to the first position, the connector 31 moves away from the first feeding mechanism 1 along the inner wall of the first through hole 321, the first through hole 321 of the connecting seat 32 gradually increases a pressure applied to the clamping portion 312, and the inner diameter of an end of the clamping cavity defined in the clamping portion 312 is reduced until the clamping teeth 3121 abut against the guide pipe 4 to clamp the guide pipe 4.

As shown in FIGS. 16 and 17, when the connector 31 is in the second position, the connecting seat 32 abuts against the annular element 311. During switching of the connector 31 from the first position to the second position, the connector 31 moves close to the first feeding mechanism 1 along the inner wall of the first through hole 321, the first through hole 321 of the connecting seat 32 gradually reduces the pressure applied to the clamping portion 312, and the inner diameter of an end of the clamping cavity defined in the clamping portion 312 is increased until the clamping teeth 3121 are separated from the guide pipe 4 to release the guide pipe 4.

Further, as shown in FIGS. 16 and 17, the connector 31 further includes tabs 3122. Each of the tabs 3122 is arranged on an inner wall of one clamping tooth 3121 and extends toward the clamping cavity. A first end of the tab 3122 is connected to the clamping tooth 3121, a second end of the tab 3122 extends toward the limiting element 313, and the tab 3122 has a certain elasticity.

The tab 3122 protrudes toward the inside of the clamping cavity, and the tab 3122 has a certain elasticity, such that when the connector 31 is in the first position, the tab 3122 is kept in a deformed state, and keeps applying an acting force to the guide pipe 4, thus improving clamping stability.

The tab 3122 may be an elastic piece, a rubber gasket or other elastic components, as long as an elastic force can be provided to maintain the connector 31 in the first position and apply an acting force to the guide pipe 4, in order to increase the friction between the guide pipe 4 and the connector 31 when the guide pipe 4 is clamped.

Further, the first end of the tab 3122 is connected to the inner wall of the clamping tooth 3121, and the second end of the tab 3122 is inserted into the clamping cavity and inclined in a direction close to the limiting element 313, such that an elastic force is applied to the guide pipe 4, which can improve clamping stability and has no affect on the insertion of the guide pipe 4 into the clamping cavity, but forms a certain resistance to the guide pipe 4 moving during reverse withdrawing from the clamping cavity. When the clamping tooth 3121 releases the guide pipe 4, the guide pipe is not likely to fall from the connector 31.

In some implementations of the present invention, the connector 31 may be connected to the connecting seat 32 by mean of at least one of clamping connection, snap-fit connection, threaded connection, and pluggable connection.

In this embodiment, an example of a pluggable connection between the connector 31 and the connecting seat 32 is provided. As shown in FIG. 2, the connector 31 is inserted into the first through hole 321 of the connecting seat 32, and the connector 31 is in the first position by means of the elastic element 33. In practice, the switching from the first position to the second position is achieved by pressing the connector 31.

In some possible embodiments of the present disclosure, the connector 31 is in snap-fit connection with the connecting seat 32; and two groups of protrusions are arranged on the connector 31 in an axial direction of the connector itself, and grooves corresponding to the protrusions are provided in the connecting seat 32, such that the connector 31 is switched between the first position and the second position by correspondingly snap-fitting the protrusions at different positions into the grooves; or protrusions are arranged on the connector 31, and two groups of grooves corresponding to the protrusions are provided in the connecting seat 32 in a normal direction of the connecting seat itself, such that the connector 31 is switched between the first position and the second position by correspondingly snap-fitting the protrusions into the grooves at different positions.

In some possible embodiments of the present disclosure, the connector 31 is in clamping connection with the connecting seat 32; and clamped members are arranged on the connector 31, and two groups of clamping seats arranged in the normal direction of the connecting seat itself are arranged on the connecting seat 32, such that the connector 31 is switched between the first position and the second position by correspondingly clamping the clamped members on the clamping seats at different positions; or clamping seats are arranged on the connector 31, and two groups of clamped members arranged in the normal direction of the connecting seat itself are arranged on the connecting seat 32, such that the connector 31 is switched between the first position and the second position by correspondingly clamping the clamped members on the clamping seats at different positions.

In some possible embodiments of the present disclosure, the connector 31 is in threaded connection with the connecting seat 32, the connecting seat 32 is provided with a first thread, the first thread may be arranged on the inner wall of the first through hole 321, and a second thread corresponding to the first thread is arranged on the connector 31, and the fixing of the connector to the connecting seat 32 and the switching of the connector 31 between the first position and the second position are implemented by screwing the connector 31; or the fixing of the connector 31 to the connecting seat 32 and the switching of the connector 31 between the first position and the second position are implemented by means of bolts.

The connector 31 may also be connected to the connecting seat 32 by other means than the clamping connection, the snap-fit connection, the threaded connection, and the pluggable connection, as long as the fixing of the connector 31 to the connecting seat 32 and the switching of the connector 31 between the first position and the second position can be implemented.

In some implementations of the present invention, the connector 31 may be connected to the guide pipe 4 by means of at least one of clamping connection, snap-fit connection, threaded connection, and pluggable connection.

In this embodiment, an example of a clamping connection between the connector 31 and the guide pipe 4 is provided. As shown in FIG. 3, the guide pipe 4 is inserted into the connector 31, and the guide pipe 4 is clamped by the clamping portion 312. In practice, the connector 31 is switched from the first position to the second position by pressing the connector 31, which in turn causes the connector 31 to be connected to or separated from the guide pipe 4.

In some possible embodiments of the present disclosure, the connector 31 is in snap-fit connection with the guide pipe 4; and protrusions/grooves are provided on the connector 31, corresponding protrusions/grooves are provided on the guide pipe 4, and thus the connector 31 is connected to or separated from the guide pipe 4 by means of snap-fit between the protrusions and the grooves.

In some possible embodiments of the present disclosure, the connector 31 is in threaded connection with the guide pipe 4, the guide pipe 4 is provided with a first thread, the connector 31 is provided with a second thread corresponding to the first thread, and thus the connector 31 is connected to or separated from the guide pipe 4 by screwing the connector 31/guide pipe 4.

In some possible embodiments of the present disclosure, the connector 31 is in pluggable connection with the guide pipe 4, an elastic gasket is arranged on the inner wall of the connector 31, the guide pipe 4 is subjected to a pressure applied by the elastic gasket when inserted into the connector 31, and thus the connector 31 is connected to or separated from the guide pipe 4 by inserting the guide pipe 4 into the connector 31 or pulling the guide pipe out from the connector 31.

The connector 31 may also be connected to the guide pipe 4 by other means than the pluggable connection, the snap-fit connection, the threaded connection, and the pluggable connection, as long as the fixing of the connector 31 to the connecting seat 32 and the switching of the connector 31 between the first position and the second position can be implemented.

According to an embodiment of a second aspect of the present invention, a 3D printer 200 is further provided, including a filament conveying device 100 according to any one of the implementations of the first aspect described above.

Further, the 3D printer 200 further includes a print head and a filament sensor, at least two filaments are respectively conveyed by the feeding channels 8 of the filament conveying device 100 and through the discharging channel 7 to the print head, and the filament sensor detects a filament passing through the print head, so as to determine whether consumables enter or exit the print head.

It may be understood that the discharging channel 7 can allow only one filament to pass through, and remaining filaments are reserved in the feeding channels 8. When it is necessary to change the filament, the filament in the discharging channel 7 is first retreated to the feeding channel 8, or the filament is cut off in the feeding channel 8.

In the descriptions of this specification, the description of the terms such as "an embodiment", "some embodiments" and "a specific embodiment" means that specific features, structures, materials or characteristics described with reference to the embodiment(s) or example(s) are included in at least one embodiment or example of the present invention. In this specification, the schematic expressions of the above terms do not necessarily refer to the same embodiment or example. Moreover, the specific features, structures, materials or characteristics described may be combined in any one or more embodiments or examples in a suitable manner.

The foregoing descriptions are merely preferred embodiments of the present invention, and are not intended to limit the present invention. For those skilled in the art, various modifications and variations may be made to the present invention. Any modifications, equivalent substitutions, improvements, etc. made within the spirit and principle of the present invention should fall within the scope of protection of the present invention.

In view of the above detailed description, these and other changes can be made to these embodiments, and this written description includes the embodiments in the best mode to disclose the present invention. The patent scope obtained by the present invention is defined by the claims, and the claims are not defined by the contents of the present disclosure, and the scope of protection of the present invention is not limited thereto. Any person skilled in the art can make equivalent replacements or changes within the scope disclosed by the present invention according to the technical solution and concept of the present invention, which shall fall within the scope of protection of the present invention.

What is claimed is:

1. A filament conveying device, comprising a feeding device and a discharging channel, wherein the feeding device comprises at least two feeding channels, a feeding port is provided at a first end of one feeding channel, and a discharging port is provided at a second end of the feeding channel, the feeding port is configured for feeding a printing filament; and wherein at least two discharging ports converge toward the discharging channel and the discharging ports are connected to the discharging channel, the at least two discharging ports are configured to direct printing filaments in the feeding channels to the discharging channel, wherein the connector further comprises an annular element, a clamping portion comprising at least two clamping teeth circumferentially arranged on the annular element, a first end of a given tooth of the at least two clamping teeth being fixed relative to the annular element, and a second end of the given tooth of the at least two clamping teeth being a free end, wherein a cavity defined by the at least two clamping teeth is a clamping cavity, a limiting element arranged at one end of the given tooth of the at least two clamping teeth away from the annular element and protruding outwardly, a tab arranged on an inner wall of the given tooth of the at least two clamping teeth, wherein the tab is extended toward the clamping cavity, a first end of the tab is connected to the given tooth of the at least two clamping teeth, a second end of the tab is extended toward the limiting element.

2. The filament conveying device according to claim 1, wherein the feeding device further comprises:

a first feeding mechanism comprising a first half housing; and a second feeding mechanism comprising a second half housing, wherein the feeding channel comprises a cavity defined by the first half housing and the second half housing.

3. The filament conveying device according to claim 2, wherein the second feeding mechanism comprises a second feeding body and a housing, the second feeding body comprises the second half housing, and the housing is configured to accommodate the first feeding mechanism and the second feeding body, the first feeding mechanism is movably connected to the second feeding body, and the second feeding body is movably connected to or fixedly connected to the housing.

4. The filament conveying device according to claim 2, wherein the feeding channel further comprises:

a linear section with one end starting from the feeding port; and an arc-shaped section with a first end connected to the linear section and a second end ending at the discharging port.

5. The filament conveying device according to claim 4, wherein the linear section is enclosed by a portion of the first half housing, and the arc-shaped section is enclosed by a portion of the first half housing and the second half housing.

6. The filament conveying device according to claim 5, wherein the linear section is closed circumferentially, and the arc-shaped section enclosed by the first half housing and the second half housing is closed circumferentially.

7. The filament conveying device according to claim 5, wherein the portion of the first half housing used to enclose the linear section is arranged inside the first feeding mechanism, the portion of the first half housing used to fit with the second half housing to enclose the arc-shaped section is exposed, and the second half housing is arranged on an inner wall of the second feeding mechanism.

8. The filament conveying device according to claim 4, wherein the linear section is enclosed by a portion of the first half housing and a portion of the second half housing; the arc-shaped section is enclosed by a portion of the first half housing and a portion of the second half housing.

9. The filament conveying device according to claim 8, wherein the first half housing is arranged on an outer wall of the first feeding mechanism, and the second half housing is arranged on an inner wall of the second feeding mechanism.

10. The filament conveying device according to claim 2, further comprising:

a plurality of guide pipes, wherein a guide pipe of the plurality of guide pipes comprises a filament channel, the filament channel is arranged in correspondence with one feeding channel; and a guide connection assembly with a first end connected to the guide pipes and a second end connected to at least one of the first feeding mechanism and the second feeding mechanism.

11. The filament conveying device according to claim 10, further comprising:

pipe receptacles, wherein the pipe receptacles are provided in the first feeding mechanism, arranged corresponding to the guide pipes, the pipe receptacles are configured for connection with an end of one guide pipe.

12. The filament conveying device according to claim 10, wherein the guide connection assembly further comprises:

a connector with one end movably connected to the guide pipe; and a connecting seat with a first end movably connected to the connector and a second end connected to at least one of the first feeding mechanism and the second feeding mechanism, first through holes being provided in the connecting seat for at least one of the guide pipes and the connector to pass through.

13. The filament conveying device according to claim 12, wherein snap fits are arranged on the connecting seat, and slots corresponding to the snap fits are provided in the second feeding mechanism.

14. The filament conveying device according to claim 12, wherein operating positions of the connector comprises a first position and a second position;

a portion of the connector moves close to the guide pipe when the connector moves from the second position to the first position, and the guide pipe is clamped when the connector reaches the first position; and a portion of the connector moves away from the guide pipe when the connector moves from the first position to the second position, and the guide pipe is released when the connector reaches the second position.

15. The filament conveying device according to claim 14, wherein the connector further comprises:

a second through hole for accommodating the guide pipe being provided in the annular element;

wherein the at least two clamping teeth are elastic such that the free ends of the at least two clamping teeth move close to or away from the guide pipe to adjust an inner diameter of one end of the clamping cavity so as to clamp or release the guide pipe.

16. The filament conveying device according to claim 15, wherein the guide connection assembly further comprises:

an elastic element with a first end connected to the connector and a second end fixed relative to the connecting seat, wherein the elastic element is configured to apply an elastic force to maintain the connector in the first position.

17. The filament conveying device according to claim 16, wherein the guide connection assembly further comprises:

a recess provided in the first feeding mechanism and arranged corresponding to the elastic element, wherein at least a part of the elastic element is located inside the recess.

18. The filament conveying device according to claim 17, wherein the connecting seat abuts against the limiting element when the connector is in the first position; and the connecting seat abuts against the annular element when the connector is in the second position.

19. A 3D printer, comprising the filament conveying device according to claim 1.

* * * * *